(12) United States Patent
Wang et al.

(10) Patent No.: US 12,491,940 B2
(45) Date of Patent: Dec. 9, 2025

(54) DUAL-MODE ACTIVE REAR-WHEEL STEERING DEVICE BASED ON MULTI-LINKAGE MECHANISM

(71) Applicant: Jilin University, Changchun (CN)

(72) Inventors: Junnian Wang, Changchun (CN); Shuo Zhuang, Changchun (CN); Dongxu Fu, Changchun (CN); Zhe Liu, Changchun (CN); Zidong Zhou, Changchun (CN); Kefu Zhu, Changchun (CN)

(73) Assignee: Jilin University, Changchun (CN)

( * ) Notice: Subject to any disclaimer, the term of this patent is extended or adjusted under 35 U.S.C. 154(b) by 532 days.

(21) Appl. No.: 18/064,330

(22) Filed: Dec. 12, 2022

(65) Prior Publication Data

US 2023/0106423 A1 Apr. 6, 2023

(30) Foreign Application Priority Data

Jan. 4, 2022 (CN) .......................... 202210001614.6
May 9, 2022 (CN) .......................... 202210498466.3

(51) Int. Cl.
*B62D 7/15* (2006.01)
*B62D 3/04* (2006.01)
(Continued)

(52) U.S. Cl.
CPC ............. *B62D 7/1545* (2013.01); *B62D 3/04* (2013.01); *B62D 5/0454* (2013.01); *B62D 7/226* (2013.01)

(58) Field of Classification Search
CPC ...... B62D 7/1545; B62D 3/04; B62D 5/0454; B62D 7/226; B62D 17/00; B62D 7/146; B62D 7/20; B62D 7/1581
See application file for complete search history.

(56) References Cited

U.S. PATENT DOCUMENTS

| | | | |
|---|---|---|---|
| 4,927,166 A | | 5/1990 | Takahashi et al. |
| 4,938,494 A | * | 7/1990 | Takahashi .............. B60G 7/006 180/409 |

(Continued)

FOREIGN PATENT DOCUMENTS

| | | | | |
|---|---|---|---|---|
| CN | 1576134 A | * | 2/2005 | ............... B62D 7/16 |
| CN | 104960568 A | * | 10/2015 | |

(Continued)

*Primary Examiner* — Drew J Brown

(57) ABSTRACT

A dual-mode active rear-wheel steering device based on a multi-linkage mechanism, including: a steering angle control motor with a speed-reduction mechanism, a multi-linkage mechanism assembly for converting rotational motion of the steering angle control motor into linear motion of an end of the push rod, a steering actuating mechanism for converting linear motion of the multi-linkage mechanism assembly into rotation of a knuckle around a kingpin to make the rear wheels steer, a first electromagnetic pin puller and a second electromagnetic pin puller respectively configured to control a first extendable-retractable push rod assembly and a second extendable-retractable push rod assembly to work at a fixed or variable axial length. The device uses the steering angle control motor to drive the two rear wheels to turn in the same direction or opposite directions through the control of energized state of the two electromagnetic pin pullers.

11 Claims, 4 Drawing Sheets

(51) Int. Cl.
*B62D 5/04* (2006.01)
*B62D 7/22* (2006.01)

(56) References Cited

U.S. PATENT DOCUMENTS

| | | | | |
|---|---|---|---|---|
| 2006/0006019 A1* | 1/2006 | Caserta | ................... | B62D 7/20 |
| | | | | 180/443 |
| 2019/0375453 A1* | 12/2019 | Buchwitz | ............... | B62D 7/166 |
| 2023/0145223 A1* | 5/2023 | Wang | ..................... | B62D 7/09 |
| | | | | 180/444 |

FOREIGN PATENT DOCUMENTS

| | | | | | |
|---|---|---|---|---|---|
| CN | 107010105 A | * | 8/2017 | ........... | B62D 5/0421 |
| CN | 107235073 A | | 10/2017 | | |
| CN | 110171472 A | * | 8/2019 | ............ | B62D 17/00 |
| CN | 112356921 A | * | 2/2021 | .............. | B60T 1/065 |
| CN | 115447669 A | * | 12/2022 | .......... | B62D 15/027 |
| CN | 115503815 A | * | 12/2022 | ............. | B62D 5/062 |
| CN | 116215644 A | * | 6/2023 | ............. | B62D 3/02 |
| CN | 109878570 B | * | 1/2024 | | |
| CN | 118701164 A | * | 9/2024 | ............... | B62D 7/16 |
| CN | 119348700 A | * | 1/2025 | ............ | B60G 15/02 |
| DE | 102019115056 A1 | * | 12/2019 | ............... | B62D 3/12 |

\* cited by examiner

DUAL-MODE ACTIVE REAR-WHEEL STEERING DEVICE BASED ON MULTI-LINKAGE MECHANISM

CROSS-REFERENCE TO RELATED APPLICATIONS

This application claims the benefit of priority from Chinese Patent Applications No. 202210498466.3 and No. 202210001614.6, respectively filed on May 9, 2022 and Jan. 4, 2022. The content of the aforementioned applications, including any intervening amendments thereto, is incorporated herein by reference in their entireties.

TECHNICAL FIELD

This application relates to automotive steering, and more particularly to a dual-mode active rear-wheel steering device based on a multi-linkage mechanism.

BACKGROUND

With the continuous development of the automotive industry, more and more attention has been paid to automobiles' maneuverability, stability and safety. The maneuverability is directly associated with the vehicle safety, and is directly determined by the steering system. For the traditional steering system of vehicles, it can only actively control the front-wheel steering angle through the steering hand wheel by the driver or other add-on electric power steering systems, but it is hard to actively control the rear-wheel steering angle, which limits the vehicle performance. Under such circumstance, a four-wheel steering technology is designed by incorporating a rear-wheel steering actuator to the front-wheel steering technology, such that the rear wheels can perform active steering according to the current condition during the steering process.

The four-wheel steering vehicle can maintain the side-slip angle of the vehicle's center of mass at zero when steering, which not only significantly enhances the dynamic steering response characteristic, but also improves the transient response characteristics such as yaw rate and lateral acceleration, so as to improve the low-speed steering agility and the high-speed driving stability. At present, many vehicle manufacturers have developed their own active rear-wheel steering systems, and applied the active rear-wheel steering system to their high-end models. Infiniti's rear-wheel active steering (RAS) technology can reach a rear-wheel steering angle of up to 1°, and the steering direction of the rear wheels can be changed in different vehicle speeds. Taking the Infiniti QX70 as an example, with the 80 km/h as the threshold, when the speed is lower than 80 km/h, the rear-wheel steering angle and the front-wheel steering angle are in opposite directions, which is conducive to enhancing the low-speed driving agility; and when the speed is higher than 80 km/h, the rear-wheel steering angle and the front-wheel steering angle are in the same direction, which contributes to improving the handling stability of the vehicle when changing lanes at high speed.

Lexus's dynamic rear steering (DRS) system can reach a rear-wheel steering angle of up to 2° according to the speed though an electric motor on the rear axle. The rear wheels and the front wheels are subjected to adverse-phase steering when travelling at a lower speed, and to in-phase steering when travelling at a higher speed, which accordingly improves the steering agility at medium-low speeds and the handling stability at high speeds. Moreover, the DRS system can work with a variable gear ratio steering system and an electric power steering (EPS) system to constitute a dynamic control system, which can accurately calculate the optimal steering angle and drive the four wheels to steer to the optimal steering angle. In this way, this system enables the vehicle to respond to the driver's intentions, comprehensively promoting the high-speed handling stability and low-speed flexibility.

In addition to improving the steering performance, the rear-wheel active steering technology can also allow the two rear wheels to turn in the same direction to improve the directional stability when braking. At present, only the rear-wheel steering system developed by Acura has the above-mentioned function. Regarding the precision all-wheel steer (PAWS) system of Acura TLX, the two rear wheels are respectively provided with an independent actuator to change the toe-in of the rear wheels, such that the steering angles of the rear wheels can be independently adjusted within ±1.8°. During the high-speed braking, the rear wheels are splayed inward, allowing for higher braking stability. However, the two independent steering actuators will weaken the system reliability. If a steering motor at one side fails and the steering motor at the other side operates normally, the vehicle will experience uncoordinated steering, resulting in safety accidents.

SUMMARY

In view of the defects in the existing rear-wheel steering techniques, this application provides a dual-mode active rear-wheel steering device, which integrates a multi-linkage mechanism and two extendable-retractable push rod assemblies to enable the two rear wheels to turn in the same or opposite directions through selective control of the energized state of two electromagnetic pin pullers, such that this device has steering and braking operation modes. The active rear-wheel steering device provided herein can simultaneously control steering angles of the two rear wheels by using one set of mechanical mechanism, which contributes to higher reliability and can effectively eliminate the decline in the system reliability caused by the excessive number of actuators, facilitating the practical application.

Technical solutions of this application are described as follows.

This application provides a dual-mode active rear-wheel steering device, comprising:
  a housing assembly;
  a steering angle control motor;
  a worm;
  a worm gear;
  a power output shaft;
  a dust-proof cover;
  a multi-linkage mechanism assembly;
  a rear-wheel steering actuating mechanism;
  a first electromagnetic pin puller; and
  a second electromagnetic pin puller;
  wherein the housing assembly is fixedly provided with the steering angle control motor; and the steering angle control motor is configured to drive rear wheels at two sides to steer and accurately control steering angles of the rear wheels;
  the worm is connected to the steering angle control motor through a shaft coupling;
  the worm gear is engaged with the worm for deceleration and torque increase;

the power output shaft is coaxially connected to the worm gear, and coaxially connected with a central hole of the rocker arm shaft via a flat key;

the dust-proof cover is sleevedly provided between the power output shaft and a housing of the rear-wheel steering system;

the multi-linkage mechanism assembly comprises a rocker arm shaft, a push rod, a first extendable-retractable push rod assembly, a second extendable-retractable push rod assembly, a first spline shaft, a first spline shaft sleeve, a second spline shaft, a second spline shaft sleeve, a plurality of ball pins, a slide rail and a first sliding block and a second sliding block;

a central hole of the rocker arm shaft is coaxially connected to the power output shaft via a key; and a shaft journal of the rocker arm shaft and a bearing are mounted on a corresponding hole on a subframe;

the plurality of ball pins comprise a first ball pin, a second ball pin, a third ball pin, a fourth ball pin, and a fifth ball pin;

the push rod is connected to a first side of a top end of the rocker arm shaft through the first ball pin;

the first spline shaft is connected to a second side of the top end of the rocker arm shaft through the second ball pin;

a first end of the first spline shaft sleeve is in spline connection with the first spline shaft, and a second end of the first spline shaft sleeve is connected to a tie rod through the third ball pin; and the first spline shaft and the first spline shaft sleeve form the first extendable-retractable push rod assembly;

the second spline shaft is connected to a bottom end of the rocker arm shaft through the fourth ball pin;

a first end of the second spline shaft sleeve is in spline connection with the second spline shaft, and a second end of the second spline shaft sleeve is connected to the tie rod through the fifth ball pin; and the second spline shaft and the second spline shaft sleeve form the second extendable-retractable push rod assembly;

the slide rail is boltedly connected to the subframe;

the first sliding block and the second sliding block are mounted inside a groove of the slide rail; the first sliding block is boltedly connected to a first sliding-pin carrier shaft at an end of the first steering tie rod, and the second sliding block is boltedly connected to a second sliding-pin carrier shaft at an end of the second steering tie rod, so as to enable shaft ends of the first steering tie rod and the second steering tie rod to only move straight along the slide rail;

the rear-wheel steering actuating mechanism, configured to transmit movement of the multi-linkage mechanism assembly to the two-side rear wheels, comprises a first steering tie rod, a second steering tie rod, a steering knuckle arm, the first sliding-pin carrier shaft and the second sliding-pin carrier shaft; the first steering tie rod is configured to drive rear wheel at a first side to turn; and the second steering tie rod is configured to drive rear wheel at a second side to turn. So steering movement of the rear wheels can be realized;

a first end of the steering knuckle arm is connected to the first steering tie rod or the second steering tie rod through ball pins, and a second end of the steering knuckle arm is cast with a steering knuckle, such that the steering knuckle arm rotates to drive the rear wheels to rotate around a kingpin to realize rear-wheel steering;

the first sliding-pin carrier shaft is hingedly connected to the first steering tie rod, and the second sliding-pin carrier shaft is hingedly connected to the second steering tie rod; a bottom shaft end of the first sliding-pin carrier shaft is sleevedly provided with a first bearing; a bottom shaft end of the second sliding-pin carrier shaft is sleevedly provided with a second bearing; the bottom shaft end of the first sliding-pin carrier shaft and the first bearing are mounted in the first bearing seat hole, and the bottom shaft end of the second sliding-pin carrier shaft and the second bearing are respectively mounted in the second bearing seat hole, such that the first sliding-pin carrier shaft and the second sliding-pin carrier are only allowed to move linearly along the slide rail;

a first shaft end of the first steering tie rod is connected to the push rod through a sixth ball pin, and a second shaft end of the first steering tie rod is connected to the steering knuckle arm through a seventh ball pin; a bottom of the sixth ball pin is rotatably supported on a top shaft end of the first sliding-pin carrier shaft.

a first shaft end of the second steering tie rod has a Y-shaped structure with two arm shaft ends; one of the two arm shaft ends of the Y-shaped structure is connected to a shaft end of the first extendable-retractable push rod assembly through an eighth ball pin, and the other of the two arm shaft ends is connected to a shaft end of the second extendable-retractable push rod assembly through a ninth ball pin; and bottoms of the eighth ball pin and the ninth ball pin are both rotatably supported on a top shaft end of the second sliding-pin carrier shaft; and a second shaft end of the second steering tie rod is connected to the steering knuckle arm through a tenth ball pin.

In an embodiment, the first electromagnetic pin puller is configured to control an axially fixed connection or disconnection between the first spline shaft and the first spline shaft sleeve, so as to extend, retract, or fix the first extendable-retractable push rod assembly;

In an embodiment, the first electromagnetic pin puller comprises a pin, an electromagnetic coil, a spring and a spring locating ring;

wherein the pin is provided in an inner hole at an end of the first extendable-retractable push rod assembly; and the pin is configured to lock or unlock an axial connection between the first spline shaft and the first spline shaft sleeve;

the electromagnetic coil is fixedly provided in a groove at an end portion of the first spline shaft;

an end of the spring is fixedly connected to an armature;

the spring locating ring is fixed in the groove at the end of the first spline shaft by wedge key connection; and the spring locating ring is configured to circumferentially locate the spring.

When the first electromagnetic coil is de-energized, the bottom of the pin is pressed under the action of the spring, so as to lock the first spline shaft in the first spline shaft sleeve, and allow the axial length of the first extendable-retractable push rod assembly to be fixed. When the electromagnetic coil is energized, an electromagnetic force generated by the electromagnetic coil attracts the pin to move downward to be completely separated from the positioning hole of the first spline shaft sleeve, such that the first extendable-retractable push rod assembly is freely extendable and retractable, and the axial length of the first extendable-retractable push rod assembly is adaptively adjustable according to the motion of the multi-linkage mechanism assembly.

In an embodiment, the second electromagnetic pin puller is configured to control an axially fixed connection or disconnection between the second spline shaft and the second spline shaft sleeve, so as to extend, retract, or fix the second extendable-retractable push rod assembly.

In an embodiment, the second electromagnetic pin puller comprises a pin, an electromagnetic coil, a spring and a spring locating ring;
  wherein the pin is fixedly provided on an end of the second extendable-retractable push rod assembly; and the pin is configured to lock or unlock an axial connection between the second spline shaft and the second spline shaft sleeve;
  the electromagnetic coil is fixed at a groove at an end portion of the second spline shaft;
  an end of the spring is fixedly connected to an armature;
  the spring locating ring is fixed in the groove at the end portion of the second spline shaft by wedge key connection; and the spring locating ring is configured to circumferentially locate the spring;

When the second electromagnetic coil is de-energized, the bottom of the pin is pressed under the action of the spring, so as to lock the second spline shaft and the second spline shaft sleeve, and allow the axial length of the second extendable-retractable push rod assembly to be fixed; when the electromagnetic coil is energized, an electromagnetic force generated by the electromagnetic coil attracts the pin to move downward to be completely separated from the positioning hole of the second spline shaft sleeve, such that the second extendable-retractable push rod assembly is extendable and retractable freely, and the axial length of the second extendable-retractable push rod assembly is adaptively adjustable according to the motion of the multi-linkage mechanism assembly.

In an embodiment, the first electromagnetic pin puller and the second electromagnetic pin puller are the same in parameters except arrangement position.

In an embodiment, when the first electromagnetic pin puller and the second electromagnetic pin puller are controlled, the multi-linkage mechanism assembly enables switching between a steering mode and a braking mode.

In an embodiment, when the first electromagnetic pin puller de-energized, the first electromagnetic pin puller is configured to axially and fixedly connect the first spline shaft with the first spline shaft sleeve, and allow the axial length of the first extendable-retractable push rod assembly to be fixed.

When the second electromagnetic pin puller is energized, the second electromagnetic pin puller is configured to completely separate the pin from the second spline shaft sleeve, such that the second extendable-retractable push rod assembly is extendable and retractable freely, that is, the axial length of the second extendable-retractable push rod assembly is adaptively adjustable according to the motion of the multi-linkage mechanism assembly.

In an embodiment, when the first electromagnetic pin puller is de-energized and the second electromagnetic pin puller is energized, a speed-reduction mechanism comprising the worm and the worm gear is configured to perform deceleration and torque increase on the torque output by the steering angle control motor, and transmit the power to the power output shaft, such that the power output shaft drives the rocker arm shaft to rotate; the push rod and the first extendable-retractable push rod assembly are configured to transmit the motion of the rocker arm shaft to the first steering tie rod and the second steering tie rod; under the constraints of the first sliding block, the second sliding block and the slide rail, a shaft end of each of the first steering tie rod and the second steering tie rod are only configured to axially move along the slide rail, and the second extendable-retractable push rod assembly is configured to work under the variable axial length mode; that is, such that the second extendable-retractable push rod assembly is extendable and retractable freely, according to motion of the multi-linkage mechanism assembly; the first steering tie rod and the second steering tie rod are configured to move in the same direction, that is, the steering angles of the left and right rear wheels are in the same direction; a steering angle of the rear wheel at an inner side of a bend is larger than a steering angle of the rear wheel at an outer side of the bend, which satisfies the ideal requirements of Ackermann steering to a certain extent. The rear-wheel steering system is working in the steering mode.

When the first electromagnetic pin puller is energized, the first electromagnetic pin puller is configured to control the first pin to be separated from the first spline shaft sleeve; the first extendable-retractable push rod assembly is extendable and retractable freely, that is, the axial length of the first extendable-retractable push rod assembly is dynamically and adaptively adjustable according to the motion of the multi-linkage mechanism assembly.

When the second electromagnetic pin puller is de-energized, the second electromagnetic pin puller is configured to fixedly connect the second spline shaft and the second spline shaft sleeve; and the axial length of the second extendable-retractable push rod assembly is fixed.

In an embodiment, when the first electromagnetic pin puller is energized and the second electromagnetic pin puller is de-energized, the speed-reduction mechanism comprising the worm and the worm gear is configured to perform deceleration and torque increase on the torque output by the steering angle control motor, and transmit the power to the power output shaft, such that the power output shaft drives the rocker arm shaft to rotate clockwise; the push rod and the second extendable-retractable push rod assembly are configured to transmit the motion of the rocker arm shaft to the first steering tie rod and the second steering tie rod; the first extendable-retractable push rod assembly is is extendable and retractable freely according to the requirements of the motion of the multi-linkage mechanism assembly; the first steering tie rod and the second steering tie rod are configured to rotate in opposite directions, that is, the steering angles of the left wheels and the right wheels have the same size and opposite directions. The rear-wheel active steering system is working under the braking mode.

Compared with the Prior Art, this Application has the Following Beneficial Effects.
1. By means of several electromechanical actuating systems, the dual-mode active rear-wheel steering device can be switched between the steering mode and the braking mode. Compared with some active rear-wheel steering systems that only improve the vehicles' steering characteristics during the steering condition, the dual-mode active rear-wheel steering device provided herein enables comprehensive improvement of the steering and braking performances under more working conditions, thereby improving the driving safety.
2. The dual-mode active rear-wheel steering device provided herein is designed on the basis of the traditional Watt link mechanism and the steering trapezoidal mechanism, and a modified linkage mechanism and two electromagnetic pin pullers are employed to realize the dual-mode active rear-wheel steering. Individual rod parts in the multi-linkage mechanism are optimized, such that a steering angle of the rear wheel at an inner side is larger than that of the rear wheel at an outer side, which satisfies the ideal requirements of Ackermann steering to a certain extent, and mitigates the tire wear during steering, facilitating the practical application.

3. The switching between the steering mode and the braking mode is enabled by controlling energization and de-energization of the two electromagnetic pin pullers, which simplifies the mode switching. Considering that the same-direction steering of the two rear wheels under the steering mode, and the opposite-direction steering of the two rear wheels under the braking mode are both performed by the mechanical structure, the system reliability is enhanced.

4. Regarding the dual-mode active rear-wheel steering device provided herein, the steering-braking dual mode is enabled in the presence of only one motor, allowing for lower complexity compared to the technical solutions adopting two motors to respectively drive the steering of the two rear wheels. Moreover, this strategy can also eliminate the uncoordinated steering caused by the normal operation of one motor and the failure of the other motor.

5. The rear-wheel steering system can be self-locked by de-energizing the two electromagnetic pin pullers, so as to avoid the swaying and vibration caused by the impact from the uneven road or obstacles on the rear wheels, effectively enhancing the safety and reliability of the system.

DETAILED DESCRIPTION OF EMBODIMENTS

This application will be described in detail below with reference to the accompanying drawings and embodiments to enable those skilled in the art to implement the technical solutions disclosed herein.

Figure 1:
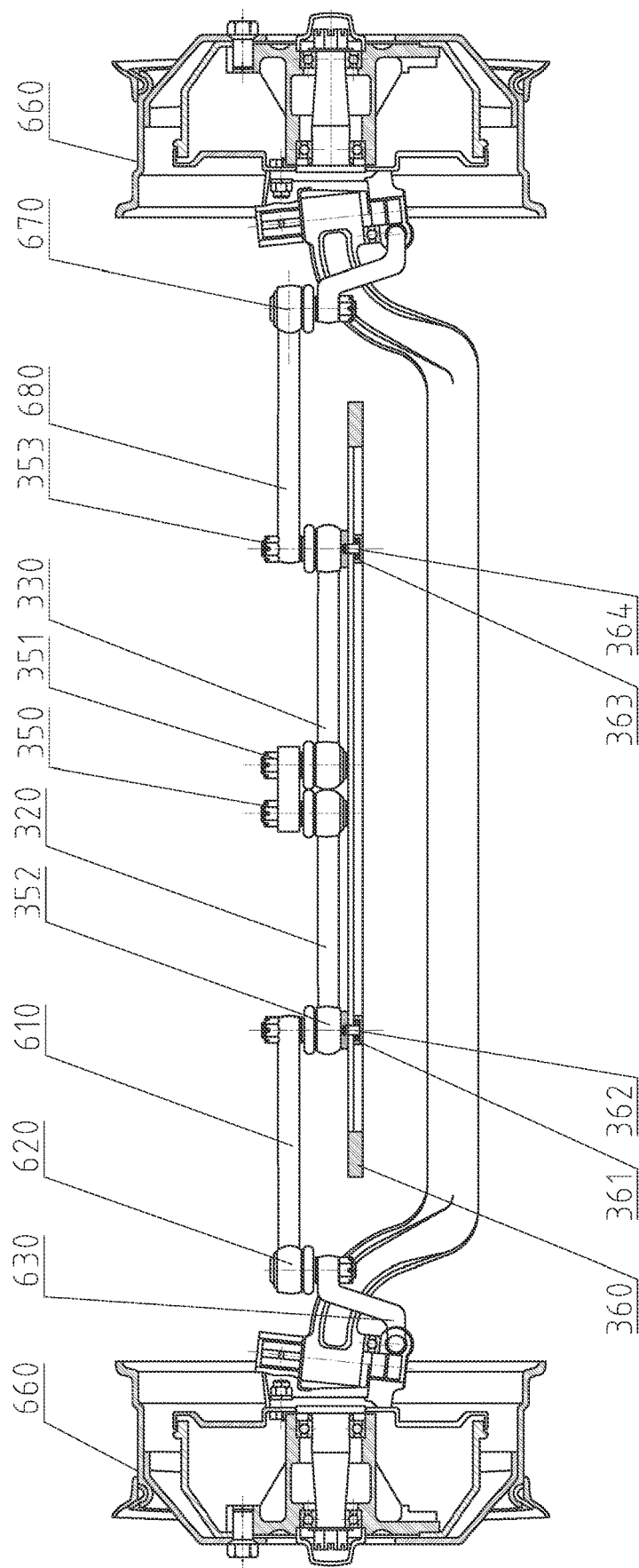
FIG. 1 structurally shows a dual-mode active rear-wheel steering device based on a multi-linkage mechanism according to an embodiment of this application.

FIG. 1 schematically shows arrangement of a dual-mode active rear-wheel steering device based on a multi-linkage mechanism on a vehicle's rear axle. Specifically, the dual-mode active rear-wheel steering device includes a steering angle control motor 110, a speed-reduction mechanism, a multi-linkage mechanism assembly, a first electromagnetic pin puller, a second electromagnetic pin puller and a steering actuating mechanism. A housing 210 of the speed-reduction mechanism is mounted on a subframe through a mounting base. An axis of the housing 210 is perpendicular to an XZ plane in a vehicle coordinate system. The steering angle control motor 110 is mounted on the housing 210 through a mounting flange 140, and the axis of the housing 210 is parallel to an axis of the steering angle control motor 110. A motor shaft 130 is connected to a worm 220 through a shaft coupling 240; the worm 220 is engaged with a worm gear 230 to transmit power a power output shaft that is integrated with the rocker arm shaft 310 in the multi-linkage mechanism assembly, so as to realize deceleration and torque increase. Under the steering mode, the first electromagnetic pin puller is de-energized, and the second electromagnetic pin puller is energized, a first spline shaft 331 and a first spline shaft sleeve 332 are fixed together, that is, a length of the first extendable-retractable push rod assembly 330 is fixed, and a second spline shaft 341 is disconnected with a second spline shaft sleeve 342, that is, the second extendable-retractable push rod assembly 340 is freely extendable and retractable. The traditional front-wheel steering vehicle generally has a rear-wheel toe-in control arm for adjusting the toe-in angle of the rear wheels at the rear suspension position. For the traditional front-wheel steering vehicles, the connection between the rear-wheel toe-in control arm and the frame can be replaced by ball pin connection between the rear-wheel toe-in control arm and the output end corresponding to the multi-linkage mechanism assembly of the rear wheel active steering device, such that the output end of the multi-linkage mechanism assembly is formed, that is, a first sliding block 361 and a second sliding block 363 slide linearly along a slide rail 360 to drive the rear wheels to perform active steering, so that the front wheel steering vehicle has the function of active rear-wheel steering. Since the rear wheels participates in the movement of the steering system and the suspension system of the automobile at the same time, the original pin connection between the control arm and the wheel should be changed to a connection between a first steering tie rod 610 and a steering knuckle arm 630 via a first ball pin 352 and a connection between a second steering tie rod 620 and the steering knuckle arm 630 via a second ball pin 353, so as to avoid the occurrence of motion interference between the steering motion and the suspension movement. Therefore, a first output end and a second output end of the multi-linkage mechanism assembly are described as follows. That is, a push rod 320 is connected to the first steering tie rod 610 through the first ball pin 352, and the first steering tie rod 610 is connected to the steering knuckle arm 630; the first extendable-retractable push rod assembly 330 and the second extendable-retractable push rod assembly 340 are connected to the second steering tie rod 680 via the second ball pin 353, and the second steering tie rod 680 is connected to the steering knuckle arm 630 through a third ball pin 620, such that a translation of the push rod 320, the first extendable-retractable push rod assembly 330 or the second extendable-retractable push rod assembly 340 drives the first steering tie rod 610 and the second steering tie rod 340 to move linearly, thereby driving the steering knuckle arm 630 to rotate around a kingpin, and the steering of the left and right rear wheels is realized.

Figure 2:
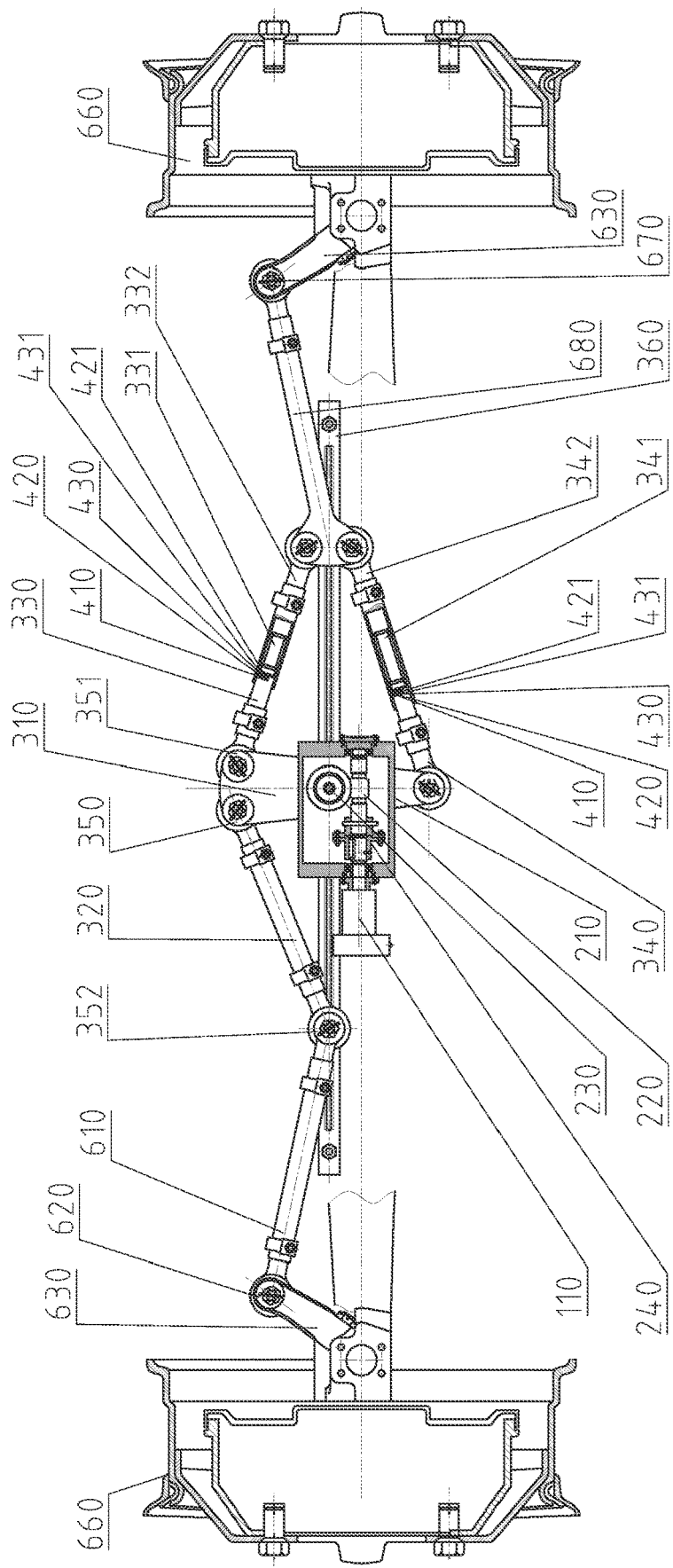
FIG. 2 is cross-sectional view of the dual-mode active rear-wheel steering device according to an embodiment of this application.
Figure 3:
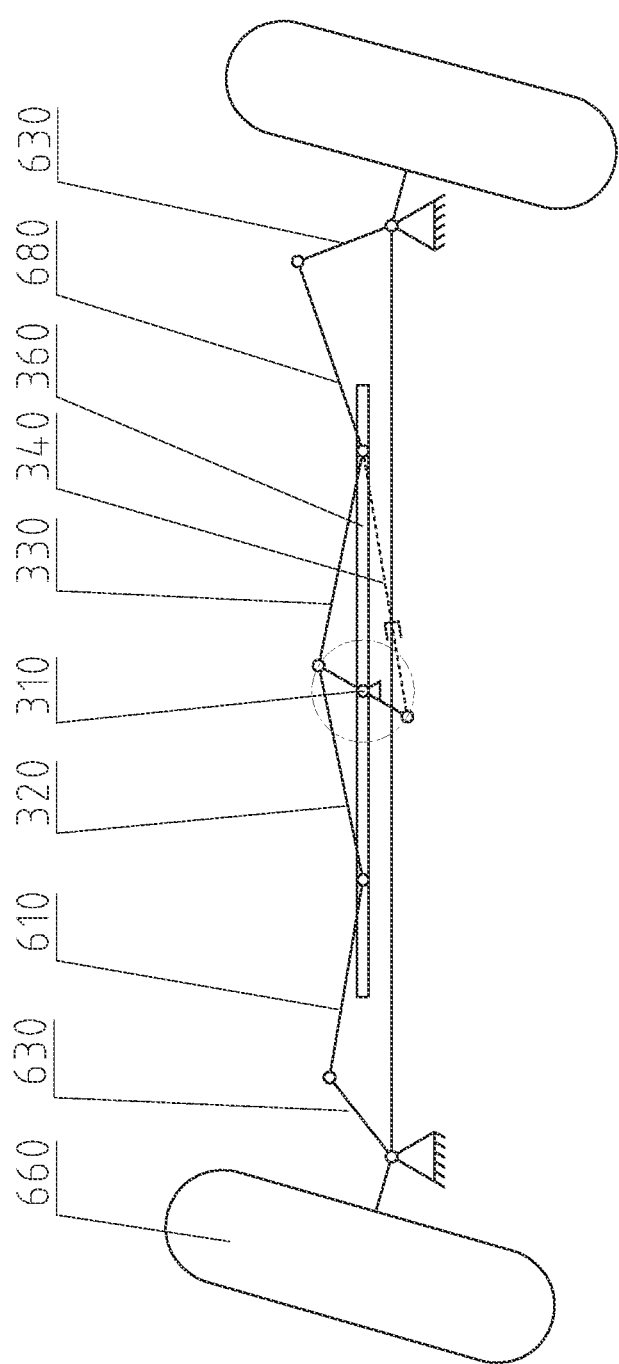
FIG. 3 schematically illustrates motion transmission of the dual-mode active rear-wheel steering device according to an embodiment of this application under a steering mode.
Figure 4:
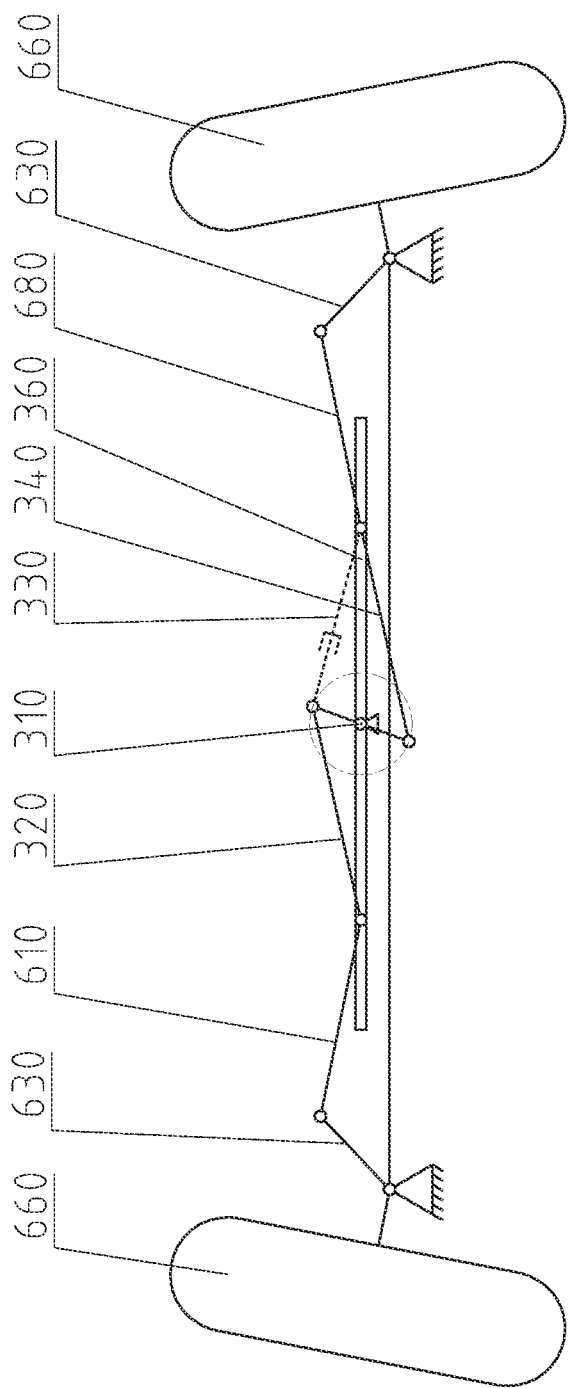
FIG. 4 schematically illustrates motion transmission of the dual-mode active rear-wheel steering device according to an embodiment of this application under a braking mode.

FIG. 2 shows a structure of the dual-mode active rear-wheel steering device provided herein. The dual-mode active rear-wheel steering device mainly includes a steering angle control motor, a speed-reduction mechanism, a multi-linkage mechanism assembly, a steering actuating mechanism, a first electromagnetic pin puller, a second electromagnetic pin puller and the housing 210.

In this embodiment, the steering angle control motor 110 is configured to drive rear wheels at both sides to steer and control a rear-wheel steering angle. The control of the rear-wheel steering angle should meet the requirements of fast responding speed, accurate angle control, stable steering angle variation, so as to prevent the vehicle from suddenly shaking. In this way, the steering angle control motor enables the bidirectional operation, precisely adjustable rotating angle, stable operation, fast actuating speed and high reliability. The steering angle control motor also have the advantages of compact structure and convenient arrangement. In an embodiment, a direct current (DC) servo motor 110 is employed, and a motor terminal is configured to provide a direct current (DC) power supply and corresponding control signals for a direct current (DC) motor.

As shown in FIGS. 1 and 2, the output end of the steering angle control motor 110 has a mounting flange, and is fixed on a first end surface casing on the housing 210 through motor connecting bolts and corresponding gaskets, and ensure that the axis of the steering angle control motor 110 is parallel to the axis of the housing 210. The motor shaft 130 of the steering angle control motor 110 is connected to the worm 220 in the speed-reduction mechanism through a shaft coupling 240 for power transmission.

As shown in FIG. 2, the worm 220 of the speed-reduction mechanism is engaged with the worm gear 230 of the speed-reduction mechanism to perform deceleration and torque increase. A center of the worm gear 230 is connected to the power output shaft via a flat key. The power output shaft is integrated with rocker arm shaft 310, and is rotatably supported on the housing 210. The power output by the steering angle control motor is directly transmitted to the rocker arm shaft 310 in the multi-linkage mechanism assembly through one-stage deceleration. The rocker arm shaft 310 is connected to the push rod 320 through a fourth ball pin 350, and the rocker arm shaft 310 is connected to the first extendable-retractable push rod assembly 330 through a fifth ball pin 351, such that the power generated by the steering angle control motor 110 is directly applied to the push rod 320 and the first extendable-retractable push rod assembly 330 or the second extendable-retractable push rod assembly 340 of the multi-linkage mechanism assembly. By selectively controlling the disconnection and connection between the first electromagnetic pin puller and the second electromagnetic pin puller, the power transmission in the multi-linkage mechanism assembly is controlled to achieve the switching between steering mode and braking mode.

As shown in FIG. 2, the multi-linkage mechanism assembly is designed on the basis of the traditional Watt link mechanism. The multi-linkage mechanism assembly mainly includes the rocker arm shaft 310, the push rod 320, the first extendable-retractable push rod assembly 330, the second extendable-retractable push rod assembly 340, the first spline shaft 331, the first spline shaft sleeve 332, the second spline shaft 341, the second spline shaft sleeve 342, and the fifth ball pin 351. The rocker arm shaft 310 and the power output shaft of the speed-reduction mechanism are integrated, and are rotatably supported on inner and outer sides of the housing 210. The push rod 320, the first extendable-retractable push rod assembly 330 and the second extendable-retractable push rod assembly 340 are all connected to the rocker shaft arm through ball pins. A first sliding block 361 is mounted in a groove of the slide rail 360, and is connected to a bottom of the first ball pin 352 through a first bolt 362. A second sliding block 363 is mounted in the groove of the slide rail 360, and is connected to a bottom of the second ball pin 353 through a second bolt 364. The first sliding block 361 and the second sliding block 363 are configured to slide linearly along the slide rail 360. The slide rail 360 is supported in the corresponding left and right seat holes of the rear-axle subframe, and is boltedly connected with the subframe.

As shown in FIG. 2, the first electromagnetic pin puller mainly includes a first pin 410, a first electromagnetic coil 421, a first spring 430 and a first spring locating ring 431. It is shown in FIG. 2 that the first electromagnetic coil 421 is fixed inside a shaft end of the first spline shaft 331.

As shown in FIG. 2, the second electromagnetic pin puller mainly includes a second pin 510, a second electromagnetic coil 521, a second spring 530 and a second spring locating ring 531. It is shown in FIG. 2 that the second electromagnetic coil 521 is fixed inside a shaft end of the second spline shaft 341.

In this embodiment, the first spring locating ring 531 is fixed inside the first spline shaft 331 through wedge key connection, so as to circumferentially locate the first spring 430. In this embodiment, a first end of the first spring 430 leans against the first spring locating ring 431, and a second end of the first spring 430 leans against the first pin 410. The first pin 410 is embedded in the first spline shaft 331 and the first spline shaft sleeve 332. A bottom of the first pin 410 abuts against the first armature 420.

Referring to an embodiment shown in FIG. 2, when the first electromagnetic pin puller is de-energized, the first pin 410 for fixing the first spline shaft 331 and the first spline shaft sleeve 332 is pressed under the action of the first spring 430, so as to lock the first spline shaft 331 and the first spline shaft sleeve 332, and allow the length of the first extendable-retractable push rod assembly 330 to be fixed. When the first electromagnetic pin puller is energized, an electromagnetic force generated by the first electromagnetic coil 421 attracts the first pin 410 to move down along a groove in the first spline shaft 331, and then abut against a tail end of the groove of the first spline shaft 331, thereby unlocking the connection between the first spline shaft 331 and the first spline shaft sleeve 332, such that the first extendable-retractable push rod assembly 330 is freely extendable and retractable, that is, the axial length of the first extendable-retractable push rod assembly 330 is dynamically and adaptively adjustable according to the motion of the multi-linkage mechanism assembly.

As shown in FIG. 2, the second electromagnetic pin puller mainly includes a second pin 510, a second spring 530, a second spring locating ring 531, and a second electromagnetic coil 521. The first electromagnetic pin puller and the second electromagnetic pin puller are basically the same in connection relationship of each component, so it will not be repeated herein.

When the second electromagnetic pin puller is de-energized, the second pin 510 for fixing the second spline shaft 341 and the second spline shaft sleeve 342 is pressed under the action of the second spring 530, so as to lock the second spline shaft 341 and the second spline shaft sleeve 342, and allow the length of the second extendable-retractable push rod assembly 340 to be fixed. When the second electromagnetic pin puller is energized, an electromagnetic attraction force generated by the second electromagnetic coil 521 attracts the second pin 510 to move down along an inner groove of the second spline shaft 342, and abut against a tail end of the groove of the second spline shaft 341, thereby unlocking the connection between the second spline shaft 341 and the first spline shaft sleeve 342, such that the second extendable-retractable push rod assembly is extendable and retractable freely, that is, the axial length of the first extendable-retractable push rod assembly 340 is dynamically and adaptively adjustable according to the motion of the multi-linkage mechanism assembly.

Referring to an embodiment shown in FIG. 2, the steering actuating mechanism adopts a steering trapezoidal structure. The steering actuating mechanism includes the first steering tie rod 610, the second steering tie rod 680, and the steering knuckle arm 630. The steering actuating mechanism is configured to transmit the motion of the multi-linkage mechanism assembly to the wheels at the other side, such that the left and right translation of the tie rod drives a series of mechanisms to control the steering angle of the rear wheel to realize the active steering of the rear wheels.

The dual-mode active rear-wheel steering device based on the multi-linkage mechanism enables steering-braking dual working mode. In an embodiment, when driving under bad road conditions, the rear-wheel steering system can be self-locked, so as to avoid the swaying and vibration caused by the impact from the road. The working principles of the dual-mode active rear-wheel steering device based on the multi-linkage mechanism are illustrated as follows.

Under the steering mode, when the first electromagnetic pin puller is de-energized, the first pin 410 that is fixed at the inner groove of the first spline shaft 331 is pressed under the action of the first spring 530, so as to fixedly connect the first spline shaft 331 and the first spline shaft sleeve 332, and lock the first extendable-retractable push rod assembly 330. When the second electromagnetic pin puller is energized, the spring force generated by the second spring 530 allows the second pin 510 to move down along the inner groove of the second spline shaft 341 and abut against the tail end of the groove of the second spline shaft 341, such that the second spline shaft 341 is disconnected from the second spline shaft sleeve 342, and the second extendable-retractable push rod assembly 340 is freely extendable and retractable, that is, the axial direction of the first extendable-retractable push rod assembly is dynamically and adaptively adjustable according to the motion of the multi-linkage mechanism assembly.

For the multi-linkage mechanism assembly, the speed-reduction mechanism including the worm 220 and the worm gear 230 is configured to perform deceleration and torque increase on the torque output by the steering angle control motor 110, and transmit the power is to the power output shaft, such that the power output shaft drives the rocker arm shaft 310 to rotate clockwise. The rocker arm shaft 310 rotates around its own axis. The rocker arm shaft 310 is configured to drive the push rod 320 and the first extendable-retractable push rod assembly 330 to move in the same direction, and transmit the force to the tie rod through ball pins, such that the second extendable-retractable push rod assembly 340 moves accordingly. The first tie rod 330 and the second tie rod 340 have the same movement direction and unequal movement displacement, such that the linear movement of the tie rod driven by the rotational movement of the rocker arm shaft 310 makes the steering knuckle arms of the left and right rear wheels rotate in the same direction. At this time, the turning directions of the left and right rear wheels are the same, and a steering angle of the rear wheel at an inner side of a bend is larger than a steering angle of the rear wheel at an outer side of the bend, that is, the steering mode is realized.

Under the braking mode, when the second electromagnetic pin puller is de-energized, the second armature 520 is tightly pressed against the second pin 520 in the inner groove of the second spline shaft 341 under the action of the second spring 530, so as to fixedly connect the second spline shaft 341 is and the second spline shaft sleeve 342, and lock the second extendable-retractable push rod assembly 340.

When the first electromagnetic pin puller is energized, the first pin 410 is configured to move down along the inner groove of the first spline shaft 331 and abut against the tail end of the inner groove of the first spline shaft 331, such that he spline shaft 331 is disconnected from the first spline sleeve 332, and the first extendable-retractable push rod assembly 330 is freely extendable and retractable, that is, the axial length of the first extendable-retractable push rod assembly is dynamically and adaptively adjustable according to the motion of the multi-linkage mechanism assembly.

For the multi-linkage mechanism assembly, the speed-reduction mechanism including the worm 220 and the worm gear 230 is configured to perform deceleration and torque increase on the torque output by the steering angle control motor 110, and transmit the power to the power output shaft, such that the power output shaft is configured to drive the rocker arm shaft 310 to rotate clockwise. The rocker arm shaft 310 rotates around its own axis clockwise. The rocker arm shaft 310 is configured to drive the push rod 320 and the second extendable-retractable push rod assembly 340 to move in opposite directions, and transmit the force to the tie rod through ball pins, such that the first extendable-retractable push rod assembly 330 moves accordingly. The first tie rod 330 and the second tie rod 340 have the opposite movement directions and equal movement displacement, such that the linear movement of the tie rod driven by the rotational movement of the rocker arm shaft 310 makes the steering knuckle arms of the left and right rear wheels rotate in opposite directions. At this time, the left and right rear wheels have opposite turning directions and equal steering angle, that is, the braking mode is realized.

Under the self-locking mode, when the first electromagnetic pin puller is de-energized, the first pin 410 is pressed under the action of the first spring 430, so as to fixedly connect the first spline shaft 331 and the first spline shaft sleeve 332, and lock the first extendable-retractable push rod assembly. When the second electromagnetic pin puller is de-energized, the second pin 510 that is fixed in the inner groove of the second spline shaft 341 is pressed under the action of the second spring 530, so as to fixedly connect the second spline shaft 341 with the second spline shaft sleeve 342, and lock the second extendable-retractable push rod assembly 340.

At this time, the first extendable-retractable push rod assembly 330 and the second extendable-retractable push rod assembly 340 are locked, and the active rear-wheel steering system is locked, so as to avoid the swaying and vibration caused by the impact from the uneven road or obstacles on the rear wheels, effectively enhancing the safety and reliability of the system.

In conclusion, the dual-mode active rear-wheel steering device based on the multi-linkage mechanism provided herein can realize the steering mode and the braking mode. In an embodiment, the dual-mode active rear-wheel steering device can realize a self-locking of the rear-wheel steering device when the impact from the uneven road is excessively large. The self-locking of the rear wheel steering system prevents the danger. The switching among the steering mode, the braking mode and the self-locking mode is realized by controlling the de-energization and energization of the first electromagnetic pin puller and the second electromagnetic pin puller, and the corresponding switching of the working modes is determined by the mode switching table shown in Table 1.

TABLE 1

Mode switching of the dual-mode active rear-wheel steering device

|  | Steering mode | Braking mode | Self-locking mode |
|---|---|---|---|
| First electromagnetic pin puller | De-energized | Energized | De-energized |
| Second electromagnetic pin puller | Energized | De-energized | De-energized |

With respect to the dual-mode active rear-wheel steering device based on the multi-linkage mechanism, a motor is configured to jointly control the steering angles of the two rear wheels, such that the two rear wheels can selectively choose to turn in the same direction or in opposite directions according to the current driving conditions, that is, the dual-mode active rear-wheel steering device has the steering mode and the braking mode. Moreover, the dual-mode active rear-wheel steering device has self-locking mode, that is, when the vehicle is impact by the uneven road, the spontaneous steering of the two rear wheels and the swaying and vibration of the vehicle are avoided, which enhances the driving safety and avoids the danger.

Described above are merely illustrative of this application, and are not intended to limit this application. It should be understood that various modifications, replacements and variations made by those skilled in the art without departing from the spirit and scope of this application shall fall within the scope of this application defined by the appended claims.

What is claimed is:

1. A dual-mode active rear-wheel steering device, comprising:
    a housing assembly;
    a steering angle control motor;
    a speed-reduction mechanism;
    a multi-linkage mechanism assembly;
    a first extendable-retractable push rod assembly;
    a second extendable-retractable push rod assembly;
    a steering actuating mechanism;
    a first electromagnetic pin puller; and
    a second electromagnetic pin puller;
    wherein a housing of the steering angle control motor is fixedly provided on an end of the housing assembly; and the steering angle control motor is configured to drive rear wheels at both sides to steer and control steering angles of the rear wheels;
    the speed-reduction mechanism is configured to perform deceleration and torque increase on an input torque of the steering angle control motor and output a torque through a power output end of the speed-reduction mechanism;
    the multi-linkage mechanism assembly comprises a push rod; and the multi-linkage mechanism assembly is configured to convert a rotational motion output by the steering angle control motor and the speed-reduction mechanism into a linear motion at an end of the push rod;
    under a steering condition, the first extendable-retractable push rod assembly is configured to work at a fixed axial length, so as to allow the rear wheels to turn in the same direction; and under a braking condition, the first extendable-retractable push rod assembly is configured to work at an adaptively-adjustable axial length according to a motion of the multi-linkage mechanism assembly;
    under the braking condition, the second extendable-retractable push rod assembly is configured to work at a fixed axial length, so as to allow the rear wheels to turn in opposite directions; and under the steering condition, the second extendable-retractable push rod assembly is configured to work at an adaptively-adjustable axial length according to the motion of the multi-linkage mechanism assembly;
    the steering actuating mechanism adopts a steering trapezoidal structure to transmit the motion of the multi-linkage mechanism assembly to the rear wheels to drive the rear wheels to turn;
    the first electromagnetic pin puller is arranged in the first extendable-retractable push rod assembly; and the first electromagnetic pin puller is configured to fix or adjust an axial length of the first extendable-retractable push rod assembly; and
    the second electromagnetic pin puller is arranged in the second extendable-retractable push rod assembly; and the second electromagnetic pin puller is configured to fix or adjust an axial length of the second extendable-retractable push rod assembly.

2. The dual-mode active rear-wheel steering device of claim 1, wherein the speed-reduction mechanism comprises:
    a worm;
    a worm gear; and
    a power output shaft;
    wherein the worm is rotatably supported inside the housing assembly, and is coaxially connected to an output shaft of the steering angle control motor through a shaft coupling for power transmission;
    the worm gear is rotatably supported inside a housing of the speed-reduction mechanism, and is engaged with the worm for transmission; and
    the power output shaft is in flat key connection with a central hole of the worm gear, and is configured as the power output end of the speed-reduction mechanism.

3. The dual-mode active rear-wheel steering device of claim 1, wherein the housing assembly comprises:
    a main housing; and
    a dust-proof cover;
    wherein the main housing is fixedly provided on a rear axle subframe of a vehicle; and the main housing is configured to accommodate and support the speed-reduction mechanism; and
    the dust-proof cover is sleevedly provided between the power output end outside a housing of the speed-reduction mechanism and the main housing.

4. The dual-mode active rear-wheel steering device of claim 1, wherein the multi-linkage mechanism assembly comprises:
    a rocker arm shaft;
    a plurality of ball pins;
    the push rod;
    a first spline shaft;
    a first spline shaft sleeve;
    a second spline shaft;
    a second spline shaft sleeve;
    a slide rail;
    a first sliding block; and
    a second sliding block;
    wherein the rocker arm shaft is coaxially connected to the power output end of the speed-reduction mechanism, and rotatably supported on the housing assembly;
    the plurality of ball pins comprise a first ball pin, a second ball pin, a third ball pin, a fourth ball pin, and a fifth ball pin;

the push rod is connected to a first side of a top end of the rocker arm shaft through the first ball pin;

a shaft end of the first spline shaft is connected to a second side of the top end of the rocker arm shaft through the second ball pin;

the first spline shaft sleeve is slidably sleeved on the first spline shaft through splined connection; a shaft end of the first spline shaft sleeve is connected to an input end at a first side of the steering actuating mechanism through the third ball pin; and the first spline shaft sleeve and the first spline shaft together form the first extendable-retractable push rod assembly;

a shaft end of the second spline shaft is connected to a bottom end of the rocker arm shaft through the fourth ball pin;

the second spline shaft sleeve is slidably sleeved on the second spline shaft through splined connection; a shaft end of the second spline shaft sleeve is connected to an input end at a second side of the steering actuating mechanism through the fifth ball pin; and the second spline shaft sleeve and the second spline shaft together form the second extendable-retractable push rod assembly;

the slide rail is boltedly connected to a rear axle subframe of a vehicle; and the first sliding block and the second sliding block are mounted in a groove of the slide rail; and a first bearing seat hole is provided inside the first sliding block, and a second bearing seat hole is provided inside the second sliding block.

5. The dual-mode active rear-wheel steering device of claim 4, wherein the steering actuating mechanism comprises:
   a first steering knuckle arm;
   a second steering knuckle arm;
   a first sliding-pin carrier shaft;
   a second sliding-pin carrier shaft;
   a first steering tie rod; and
   a second steering tie rod;
   wherein the first steering knuckle arm is integrally formed with a first wheel bracket that supports a rear wheel at a first side of the vehicle, and is configured to drive the rear wheel at the first side of the vehicle to turn around an actual kingpin or a virtual kingpin of the rear wheel at the first side of the vehicle;
   the second steering knuckle arm is integrally formed with a second wheel bracket that supports a rear wheel at a second side of the vehicle, and is configured to drive the rear wheel at the second side of the vehicle to turn around an actual kingpin or a virtual kingpin of the rear wheel at the second side of the vehicle;
   the first sliding-pin carrier shaft is hingedly connected to the first steering tie rod, and the second sliding-pin carrier shaft is hingedly connected to the second steering tie rod; a bottom shaft end of the first sliding-pin carrier shaft is sleevedly provided with a first bearing; a bottom shaft end of the second sliding-pin carrier shaft is sleevedly provided with a second bearing; the bottom shaft end of the first sliding-pin carrier shaft and the first bearing are mounted in the first bearing seat hole, and the bottom shaft end of the second sliding-pin carrier shaft and the second bearing are respectively mounted in the second bearing seat hole, such that the first sliding-pin carrier shaft and the second sliding-pin carrier are only allowed to move linearly along the slide rail;
   the plurality of ball pins further comprise a sixth ball pin, a seventh ball pin, an eighth ball pin, a ninth ball pin and a tenth ball pin;
   a first shaft end of the first steering tie rod is connected to a shaft end of the push rod through the sixth ball pin; and a bottom of the sixth ball pin is rotatably supported on a top shaft end of the first sliding-pin carrier shaft, and a second shaft end of the first steering tie rod is connected to the first steering knuckle arm through the seventh ball pin to drive the first steering knuckle arm to move; and
   a first shaft end of the second steering tie rod has a Y-shaped structure with two arm shaft ends; one of the two arm shaft ends of the Y-shaped structure is connected to a shaft end of the first extendable-retractable push rod assembly through the eighth ball pin, and the other of the two arm shaft ends is connected to a shaft end of the second extendable-retractable push rod assembly through the ninth ball pin; and bottoms of the eighth ball pin and the ninth ball pin are both rotatably supported on a top shaft end of the second sliding-pin carrier shaft; and a second shaft end of the second steering tie rod is connected to the second steering knuckle arm through the tenth ball pin to drive the second steering knuckle arm to move.

6. The dual-mode active rear-wheel steering device of claim 4, wherein the first electromagnetic pin puller comprises:
   a pin;
   an electromagnetic coil;
   a spring; and
   a spring locating ring;
   wherein the pin is mounted in an inner hole of the first spline shaft on a middle portion of the first extendable-retractable push rod assembly; and the pin is configured to lock or unlock an axial connection between the first spline shaft and the first spline shaft sleeve;
   the electromagnetic coil is fixed in a groove at an end portion of the first spline shaft;
   the spring is mounted in the inner hole of the first spline shaft, and an end of the spring abuts against the pin;
   the spring locating ring is fixed in the groove at the end portion of the first spline shaft by wedge key connection; and the spring locating ring is configured to circumferentially locate the spring;
   when the electromagnetic coil is de-energized, the pin is locked in a positioning hole of the first spline shaft sleeve under the action of the spring, so as to lock the first spline shaft in the first spline shaft sleeve, and allow the axial length of the first extendable-retractable push rod assembly to be fixed; when the electromagnetic coil is energized, an electromagnetic force generated by the electromagnetic coil attracts the pin to move downward to be completely separated from the positioning hole of the first spline shaft sleeve, such that the first extendable-retractable push rod assembly is freely extendable and retractable, and the axial length of the first extendable-retractable push rod assembly is adaptively adjustable according to the motion of the multi-linkage mechanism assembly.

7. The dual-mode active rear-wheel steering device of claim 4, wherein the second electromagnetic pin puller comprises:
   a pin;
   an electromagnetic coil;
   a spring; and
   a spring locating ring;

wherein the pin is mounted in an inner hole of the second spline shaft on a middle portion of the second extendable-retractable push rod assembly; and the pin is configured to lock or unlock an axial connection between the second spline shaft and the second spline shaft sleeve;

the electromagnetic coil is fixed in a groove at an end portion of the second spline shaft;

the spring is mounted in the inner hole of the second spline shaft, and an end of the spring abuts against the pin;

the spring locating ring is fixed in the groove at the end portion of the second spline shaft by wedge key connection; and the spring locating ring is configured to circumferentially locate the spring;

when the electromagnetic coil is de-energized, the pin is locked in a positioning hole of the second spline shaft sleeve under the action of the spring, so as to lock the second spline shaft in the second spline shaft sleeve, and allow the axial length of the second extendable-retractable push rod assembly to be fixed; when the electromagnetic coil is energized, an electromagnetic force generated by the electromagnetic coil attracts the pin to move downward to be completely separated from the positioning hole of the second spline shaft sleeve, such that the second extendable-retractable push rod assembly is extendable and retractable freely, and the axial length of the second extendable-retractable push rod assembly is adaptively adjustable according to the motion of the multi-linkage mechanism assembly.

8. The dual-mode active rear-wheel steering device of claim 1, wherein the first extendable-retractable push rod assembly and the second extendable-retractable push rod assembly are controlled to work at a fixed axial length or a variable axial length respectively by controlling de-energization and energization of the first electromagnetic pin puller and the second electromagnetic pin puller, so as to enable switching among steering mode, braking mode and self-locking mode;

when the first electromagnetic pin puller is de-energized and the second electromagnetic pin puller is energized, the dual-mode active rear-wheel steering device operates in the steering mode, and the rear wheels at both sides turn in the same direction according to a steering trapezoidal pattern;

when the first electromagnetic pin puller is energized and the second electromagnetic pin puller is de-energized, the dual-mode active rear-wheel steering device operates in the braking mode, and the rear wheels at both sides turn at equal angle in opposite directions; and when the first electromagnetic pin puller and the second electromagnetic pin puller are both de-energized, the dual-mode active rear-wheel steering device operates in the self-locking mode, and the rear wheels are locked and kept at a straight center position.

9. The dual-mode active rear-wheel steering device of claim 1, wherein the first electromagnetic pin puller and the second electromagnetic pin puller are the same in parameters except arrangement position.

10. The dual-mode active rear-wheel steering device of claim 2, wherein the worm is rotatably supported inside the housing assembly via a first bearing; and the worm wheel is rotatably supported inside the housing of the speed-reduction mechanism via a second bearing.

11. The dual-mode active rear-wheel steering device of claim 4, wherein the rocker arm shaft is rotatably supported on the housing assembly via a bearing.

* * * * *